(12) United States Patent
Kim et al.

(10) Patent No.: US 11,648,590 B2
(45) Date of Patent: *May 16, 2023

(54) CLEANING APPARATUS AND METHOD OF OBJECT DETECTION SENSOR

(71) Applicant: Hyundai Mobis Co., Ltd., Seoul (KR)

(72) Inventors: Won Gyum Kim, Yongin-si (KR); Young Shin Kim, Yongin-si (KR); Kyung Rin Kim, Yongin-si (KR); Sung Eun Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 144 days.

This patent is subject to a terminal disclaimer.

(21) Appl. No.: 17/359,842

(22) Filed: Jun. 28, 2021

(65) Prior Publication Data

US 2021/0323032 A1 Oct. 21, 2021

Related U.S. Application Data

(63) Continuation of application No. 16/408,996, filed on May 10, 2019, now Pat. No. 11,077,472.

(30) Foreign Application Priority Data

May 15, 2018 (KR) .................. 10-2018-0055644

(51) Int. Cl.
*B08B 3/02* (2006.01)
*B08B 3/08* (2006.01)
(Continued)

(52) U.S. Cl.
CPC .............. *B08B 3/02* (2013.01); *B08B 3/08* (2013.01); *B60S 1/48* (2013.01); *B60S 1/56* (2013.01); *G05D 1/0231* (2013.01)

(58) Field of Classification Search
None
See application file for complete search history.

(56) References Cited

U.S. PATENT DOCUMENTS 9,304,377 B2   4/2016   Eineren et al.
9,821,771 B2   11/2017  Shimizu et al.
(Continued)

FOREIGN PATENT DOCUMENTS

JP   2016-179767       10/2016
KR   20-1998-0039261    9/1998
KR   10-2017-0124871   11/2017

OTHER PUBLICATIONS

Office Action dated Apr. 5, 2022, issued to Korean Patent Application No. 10-2018-0055644.
(Continued)

*Primary Examiner* — Rita P Adhlakha
(74) *Attorney, Agent, or Firm* — H.C. Park & Associates, PLC

(57) ABSTRACT

A cleaning apparatus of an object detection sensor including: an environment information acquisition unit configured to acquire surrounding environment information of a vehicle; and a cleaning unit configured to create a cleaning solution mixture based on the surrounding environment information acquired by the environment information acquisition unit, and clean a cover installed on the object detection sensor to protect the object detection sensor from foreign matter by spraying the created cleaning solution mixture onto the cover, in order to prevent a reduction in sensing performance of the object detection sensor due to contamination by the foreign matter. The object detection sensor may sense a target object by transmitting a scan signal to the target object and receiving a sensing signal reflected from the target (Continued)

object, and the scan signal and the sensing signal may be transmitted and received through the cover.

7 Claims, 3 Drawing Sheets

(51) Int. Cl.
*B60S 1/56* (2006.01)
*B60S 1/48* (2006.01)
*G05D 1/02* (2020.01)

(56) References Cited

U.S. PATENT DOCUMENTS

| 2013/0018546 | A1 | 1/2013 | Zimmer | |
|---|---|---|---|---|
| 2016/0101735 | A1* | 4/2016 | Trebouet | B60S 1/528 |
| | | | | 348/148 |
| 2018/0022317 | A1* | 1/2018 | Hakeem | B60S 1/02 |
| | | | | 701/48 |

OTHER PUBLICATIONS

Non-Final Office Action dated May 7, 2020, issued in U.S. Appl. No. 16/408,996.
Final Office Action dated Nov. 24, 2020, issued in U.S. Appl. No. 16/408,996.
Non-Final Office Action dated Mar. 11, 2021, issued in U.S. Appl. No. 16/408,996.
Notice of Allowance dated May 7, 2021, issued in U.S. Appl. No. 16/408,996.

* cited by examiner

CLEANING APPARATUS AND METHOD OF OBJECT DETECTION SENSOR

CROSS-REFERENCES TO RELATED APPLICATION

This application is a Continuation of U.S. patent application Ser. No. 16/408,996, filed on May 10, 20219, and claims priority from and the benefit of Korean Application No. 10-2018-0055644, filed on May 15, 2018, which is hereby incorporated by reference for all purposes as if set forth herein.

BACKGROUND

Field

Exemplary embodiments relate to a cleaning apparatus and method of an object detection sensor, and more particularly, to a cleaning apparatus and method of an object detection sensor, which can prevent a reduction in sensing performance of a sensor for detecting a target object.

Discussion of the Background

An autonomous vehicle refers to a vehicle which autonomously decides a drive path by recognizing the surrounding environment through an outside information sensing and processing function during driving, and independently drives using it own power. Although a driver does not operate a steering wheel, an acceleration pedal, a brake or the like, the autonomous vehicle can travel to the destination by itself while preventing a collision with an obstacle existing on the drive path and adjusting the vehicle speed and driving direction depending on the shape of a road. For example, the autonomous vehicle may perform acceleration on a straight road, and perform deceleration on a curved road while changing the driving direction in response to the curvature of the road.

A driver assistance system which is currently applied to a vehicle is configured as an individual system or includes a small number of systems to which a single sensor is applied. However, in order to implement a high-level autonomous driving system in the future, a high-precision sensor is expected to be applied. The need to apply a LiDAR (Light Detection And Ranging Sensor) with high distance resolution as a sensor for satisfying such a demand is increasing.

In general, a sensor such as the LiDAR, which is applied to a vehicle to sense an outside object, may be mounted on a front bumper of the vehicle, and the sensing performance of the sensor may be significantly degraded when the sensor is mounted in glass or a vehicle body. Thus, the sensor is generally mounted so as to be extended to the outside, and has a separate cover for protecting the sensor from foreign matter.

Since the LiDAR senses an object through a method of transmitting/receiving light, the object sensing performance of the LiDAR is very sensitive to contamination of the cover for protecting the LiDAR from foreign matter. Thus, the LiDAR requires an apparatus capable of effectively preventing contamination of the cover by foreign matter.

The above information disclosed in this Background section is only for enhancement of understanding of the background of the invention and, therefore, it may contain information that does not constitute prior art.

SUMMARY

Exemplary embodiments of the present invention are directed to a cleaning apparatus and method of an object detection sensor, which can clean a cover installed on the object detection sensor such as a LiDAR in consideration of the surrounding environment of a vehicle, thereby effectively block contamination of the cover by foreign matter and preventing a reduction in sensing performance of the object detection sensor.

In one embodiment, a cleaning apparatus of an object detection sensor may include: an environment information acquisition unit configured to acquire surrounding environment information of a vehicle; and a cleaning unit configured to create a cleaning solution mixture based on the surrounding environment information acquired by the environment information acquisition unit, and clean a cover installed on the object detection sensor to protect the object detection sensor from foreign matter by spraying the created cleaning solution mixture onto the cover, in order to prevent a reduction in sensing performance of the object detection sensor due to contamination by the foreign matter. The object detection sensor may sense a target object by transmitting a scan signal to the target object and receiving a sensing signal reflected from the target object, and the scan signal and the sensing signal may be transmitted and received through the cover.

The cleaning unit may create the cleaning solution mixture by mixing a volatile cleaning solution and a nonvolatile cleaning solution.

The surrounding environment information may include the content of organic matter in the atmosphere, and the cleaning unit may create the cleaning solution mixture by adjusting the mixing ratio of the volatile cleaning solution to the nonvolatile cleaning solution based on the content of organic matter in the atmosphere.

The cleaning unit may create the cleaning solution mixture by increasing the ratio of the volatile cleaning solution as the content of organic matter in the atmosphere increases.

When the content of organic matter in the atmosphere is equal to or more than a preset reference content, the cleaning unit may create the cleaning solution mixture by increasing the ratio of the volatile cleaning solution with respect to a preset reference mixing ratio.

The surrounding environment information may include outside temperature. When the outside temperature is equal to or more than preset reference temperature, the cleaning unit may create the cleaning solution mixture by adding an organic coating agent to a mixture of the volatile cleaning solution and the nonvolatile cleaning solution.

The object detection sensor may include a LiDAR, and the environment information acquisition unit may include a navigation terminal.

In another embodiment, a cleaning method of an object detection sensor may include: acquiring, by an environment information acquisition unit, surrounding environment information of a vehicle; creating, by a cleaning unit, a cleaning solution mixture based on the surrounding environment information acquired by the environment information acquisition unit; and cleaning, by the cleaning unit, a cover installed on the object detection sensor to protect the object detection sensor from foreign matter by spraying the created cleaning solution mixture onto the cover, in order to prevent a reduction in sensing performance of the object detection sensor due to contamination by the foreign matter. The object detection sensor may sense a target object by transmitting a scan signal to the target object and receiving a sensing signal reflected from the target object, and the scan signal and the sensing signal may be transmitted and received through the cover.

In the creating of the cleaning solution mixture, the cleaning unit may create the cleaning solution mixture by mixing a volatile cleaning solution and a nonvolatile cleaning solution.

The surrounding environment information may include the content of organic matter in the atmosphere. In the creating of the cleaning solution mixture, the cleaning unit may create the cleaning solution mixture by adjusting the mixing ratio of the volatile cleaning solution to the nonvolatile cleaning solution based on the content of organic matter in the atmosphere.

In the creating of the cleaning solution mixture, the cleaning unit may create the cleaning solution mixture by increasing the ratio of the volatile cleaning solution as the content of organic matter in the atmosphere increases.

In the creating of the cleaning solution mixture, when the content of organic matter in the atmosphere is equal to or more than a preset reference content, the cleaning unit may create the cleaning solution mixture by increasing the ratio of the volatile cleaning solution with respect to a preset reference mixing ratio.

The surrounding environment information may include outside temperature. In the creating of the cleaning solution mixture, when the outside temperature is equal to or more than preset reference temperature, the cleaning unit may create the cleaning solution mixture by adding an organic coating agent to a mixture of the volatile cleaning solution and the nonvolatile cleaning solution.

The cleaning method may further include determining, by the cleaning unit, whether a remaining amount of the volatile cleaning solution and a remaining amount of the nonvolatile cleaning solution are equal to or more than a preset reference amount. The acquiring of the surrounding environment information, the creating of the cleaning solution mixture and the cleaning of the cover may be performed only when both of the remaining amount of the volatile cleaning solution and the remaining amount of the nonvolatile cleaning solution are equal to or more than the reference amount.

The cleaning method may further include informing a user that one or more of the volatile cleaning solution and the nonvolatile cleaning solution need to be supplied, when it is determined that the one or more of the remaining amount of the volatile cleaning solution and the remaining amount of the nonvolatile cleaning solution are less than the reference amount.

In accordance with the embodiments of the present invention, the cleaning apparatus and method can differently create the cleaning solution for cleaning the cover installed on the object detection sensor, depending on the surrounding environment of the vehicle, and clean the cover using the cleaning solution, thereby effectively blocking contamination of the cover by foreign matter and securing the sensing performance of the object detection sensor which is optimized to the surrounding environment of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereafter, a cleaning apparatus and method of an object detection sensor in accordance with embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 1:
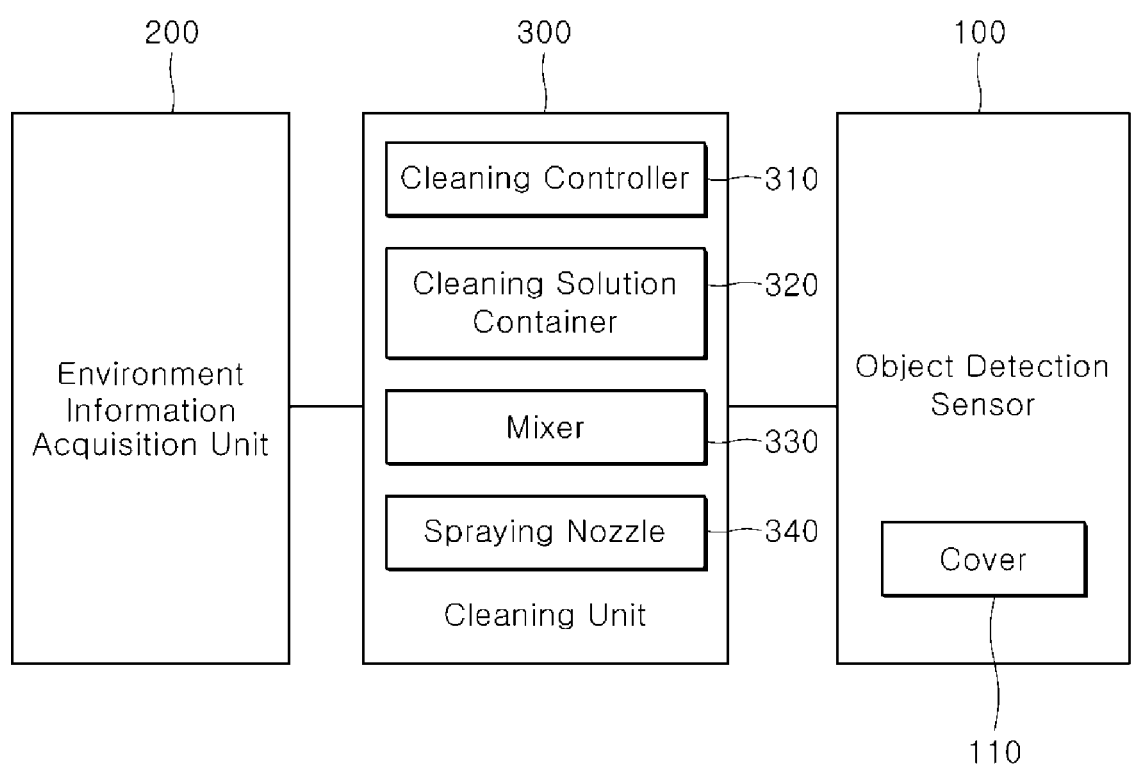
FIG. 1 is a block diagram for describing a cleaning apparatus of an object detection sensor in accordance with an embodiment of the present invention.

FIG. 1 is a block diagram for describing a cleaning apparatus of an object detection sensor in accordance with an embodiment of the present invention.

Referring to FIG. 1, the cleaning apparatus of the object detection sensor in accordance with the embodiment of the present invention may include an environment information acquisition unit 200 and a cleaning unit 300. The cleaning unit 300 may include a cleaning controller 310, a cleaning solution container 320, a mixer 330 and a spraying nozzle 340.

First, the object detection sensor 100 which is the target of a cleaning operation in the present embodiment will be described as follow. The object detection sensor 100 may sense a target object by transmitting a scan signal to the target object and receiving a sensing signal reflected from the target object. The scan signal may be defined as a signal which the object detection sensor 100 transmits to sense the target object, and the sensing signal may be defined as a signal which is returned to the object detection sensor 100 after the scan signal has been reflected from the target object. In the present embodiment, it is described that the object detection sensor 100 is applied to the front bumper of a vehicle, for convenience of description. However, the present invention is not limited thereto, but the object detection sensor 100 in accordance with the present embodiment may be applied to all kinds of systems which can sense an outside object through a transmitted signal and a received signal.

In the present embodiment, the object detection sensor 100 may include a LiDAR (Light Detection And Ranging Sensor). Thus, the object detection sensor 100 may include a laser diode, a mirror unit and a receiver unit. The laser diode may emit a scan signal. The mirror unit may adjust the scan angle of the object detection sensor 100 while the rotation angle thereof is adjusted by an actuator such as a motor, and transmit the scan signal emitted from the laser diode to the outside by reflecting the scan signal. The receiver unit may receive a sensing signal. Through the above-described configuration, the object detection sensor 100 may sense a target object by transmitting a laser point (i.e. scan signal) to the target object and measuring the time required until a sensing signal is reflected from the target object and returned to the object detection sensor 100 and the intensity of the sensing signal. That is, the object detection sensor 100 may detect the distance from the vehicle to the target object and the shape of the target object.

The object detection sensor 100 may include a cover 110 for protecting the object detection sensor 100 from foreign matter. The cover 110 may be positioned in the direction that the scan signal is transmitted from the object detection sensor 100 or the sensing signal is received by the object detection sensor 100, and house the laser diode, the mirror unit and the receiver unit therein. The cover 110 may be formed in various shapes depending on the shape of the object detection sensor 100 (for example, plane shape, curved shape and the like).

Since the scan signal transmitted from the object detection sensor 100 and the sensing signal received by the object detection sensor 100 penetrate the cover 110, the object sensing performance of the object detection sensor 100 is very sensitive to contamination of the cover 110.

Therefore, the cleaning apparatus of the object detection sensor in accordance with the present embodiment may employ the cleaning unit 300 to block the sensor cover from being contaminated by foreign matter, thereby preventing a reduction in sensing performance of the object detection sensor 100.

The environment information acquisition unit 200 may acquire surrounding environment information of the vehicle and transfer the acquired information to the cleaning unit 300. The surrounding environment information acquired by the environment information acquisition unit 200 may include one or more of the content of organic matter in the atmosphere and the outside temperature, the content of organic matter indicating an air pollution level. The surrounding environment information may further include the current weather situation and the region where the vehicle is driving.

In order to acquire such surrounding environment information, the environment information acquisition unit 200 may include a navigation terminal which is typically mounted in a vehicle to show a drive path to a user. Thus, the navigation terminal may acquire the surrounding environment information of the vehicle through a method of determining the region where the vehicle is driving, using GPS (Global Positioning System) information, and receiving the outside temperature and the content of organic matter in the atmosphere in the region where the vehicle is driving, from an external server (for example, weather server).

The cleaning unit 300 may create a cleaning solution mixture based on the surrounding environment information acquired by the environment information acquisition unit 200, and clean the cover 110 by spraying the created cleaning solution mixture onto the cover 110, thereby preventing a reduction in sensing performance of the object detection sensor 100 due to contamination by foreign matter. For this operation, as illustrated in FIG. 1, the cleaning unit 300 may include a cleaning controller 310, a cleaning solution container 320, a mixer 330 and a spraying nozzle 340.

The cleaning solution container 320 may serve to contain a volatile cleaning solution and a nonvolatile cleaning solution which are to be mixed by the mixer 330, in order to create the cleaning solution mixture to be sprayed onto the cover 110. That is, the cleaning controller 310 may create the cleaning solution mixture by mixing the volatile cleaning solution and the nonvolatile cleaning solution through the mixer 330. Thus, the cleaning solution container 320 may be divided into a volatile cleaning solution container (not illustrated) for containing the volatile cleaning solution and a nonvolatile cleaning solution container (not illustrated) for containing the nonvolatile cleaning solution. Furthermore, as described below, the cleaning controller 310 may create the cleaning solution mixture by adding an organic coating agent to a mixture of the volatile cleaning solution and the nonvolatile cleaning solution. For this operation, the cleaning solution container 320 may include an organic coating agent container (not illustrated) which is formed separately from the volatile cleaning solution container and the nonvolatile cleaning solution container, in order to contain the organic coating agent.

The mixer 330 may serve to mix the volatile cleaning solution and the nonvolatile cleaning solution under control of the cleaning controller 310. That is, the mixer 330 may receive the volatile cleaning solution and the nonvolatile cleaning solution from the volatile cleaning solution container and the nonvolatile cleaning solution container, respectively, and mix the volatile cleaning solution and the nonvolatile cleaning solution. The volatile cleaning solution and the nonvolatile cleaning solution may be mixed through various methods. For example, the volatile cleaning solution and the nonvolatile cleaning solution may be mixed through a rotating arm, a derivative mixture or a foam generator, and the present invention is not limited to a specific mixing method.

The spraying nozzle 340 may serve to spray the cleaning solution mixture formed by the mixer 330 onto the cover 110 under control of the cleaning controller 310.

The cleaning controller 310 may create the cleaning solution mixture based on the surrounding environment information acquired by the environment information acquisition unit 200, and clean the cover 110 by spraying the created cleaning solution mixture onto the cover 110. For this operation, the cleaning controller 310 may be configured as a cleaning ECU (Electronic Control Unit) for controlling the mixer 330 and the spraying nozzle 340.

The cleaning controller 310 may create the cleaning solution mixture by mixing the volatile cleaning solution and the nonvolatile cleaning solution through the mixer 330. That is, the volatile cleaning solution (for example, isopropyl alcohol) exhibits an excellent drying ability, but relatively lacks a cleaning ability, and the nonvolatile cleaning solution (for example, monoethyl ether acetate) exhibits an excellent cleaning ability, but relatively lacks a drying ability. Therefore, the cleaning controller 310 may compensate for the disadvantages of the respective cleaning solutions by mixing the volatile cleaning solution and the nonvolatile cleaning solution, thereby more effectively cleaning the cover 110.

At this time, the cleaning controller 310 may create the cleaning solution mixture by adjusting the mixing ratio of the volatile cleaning solution to the nonvolatile cleaning solution based on the content of organic matter in the atmosphere, which is included in the surrounding environment information. That is, the cleaning controller 310 may compensate for the disadvantages of the respective cleaning solutions by mixing the volatile cleaning solution and the nonvolatile cleaning solution, and create the cleaning solution mixture which is more active to the surrounding environment of the vehicle, by adjusting the mixing ratio of the respective cleaning solutions based on the content of organic matter in the atmosphere, which makes it possible to maximize the cleaning ability for the cover 110.

Through the method of adjusting the mixing ratio of the volatile cleaning solution to the nonvolatile cleaning solution based on the content of organic matter in the atmosphere, the cleaning controller 310 may create the cleaning solution mixture by increasing the ratio of the volatile cleaning solution as the content of organic matter in the atmosphere increases.

That is, the cleaning ability of the volatile cleaning solution such as isopropyl alcohol with respect to organic matter is more excellent than that of the nonvolatile cleaning solution. Therefore, as the content of organic matter in the atmosphere increases, the cleaning controller 310 may create the cleaning solution mixture by increasing the ratio of the volatile cleaning solution, in order to effectively remove the organic matter adsorbed on the surface of the cover 110.

As another method of adjusting the mixing ratio of the volatile cleaning solution to the nonvolatile cleaning solution based on the content of organic matter in the atmosphere, the cleaning controller 310 may create the cleaning solution mixture by increasing the ratio of the volatile cleaning solution with respect to a preset reference mixing ratio, when the content of organic matter in the atmosphere is equal to or more than a preset reference content.

That is, when the content of organic matter in the atmosphere is less than the reference content, general contaminants need to be cleaned prior to the organic matter adsorbed on the surface of the cover 110. Here, the reference content may be properly designed in consideration of the amount of organic matter which may cause a performance reduction of the object detection sensor 100. Therefore, the cleaning controller 310 may create the cleaning solution mixture by mixing the volatile cleaning solution and the nonvolatile cleaning solution based on the preset reference mixing ratio, until the content of organic matter in the atmosphere reaches the reference content. Here, the reference mixing ratio may be properly designed in consideration of a trade-off relation between the cleaning ability and the drying ability of each of the cleaning solutions.

On the other hand, when the content of organic matter in the atmosphere exceeds the reference content, the organic matter adsorbed on the surface of the cover 110 need to be preferentially removed. Therefore, the cleaning controller 310 may create the cleaning solution mixture by increasing the ratio of the volatile cleaning solution with respect to the reference mixing ratio.

As described above, the surrounding environment information acquired by the environment information acquisition unit 200 may include outside temperature. Thus, when the outside temperature is equal to or more than the preset reference temperature, the cleaning controller 310 may create the cleaning solution mixture by adding an organic coating agent to the mixture of the volatile cleaning solution and the nonvolatile cleaning solution in order to prevent deterioration of the cover 110.

The cleaning controller 310 may determine whether a remaining amount of the volatile cleaning solution and a remaining amount of the nonvolatile cleaning solution are equal to or more than a preset reference amount, before the cleaning operation in accordance with the present embodiment is performed or the environment information acquisition unit 200 acquires driving environment information. At this time, the cleaning controller 310 may determine the remaining amount of the cleaning solution through various methods, for example, a method using a remaining cleaning solution sensor. Only when both of the remaining amount of the volatile cleaning solution and the remaining amount of the nonvolatile cleaning solution are equal to or more than the reference amount, the cleaning controller 310 may perform the cleaning operation in accordance with the present embodiment. When one or more of the remaining amount of the volatile cleaning solution and the remaining amount of the nonvolatile cleaning solution are less than the reference amount, the cleaning controller 310 may inform a user that one or more of the volatile cleaning solution and the nonvolatile cleaning solution need to be supplied, through a display device (for example, an LCD installed in a cluster unit).

Figure 2:
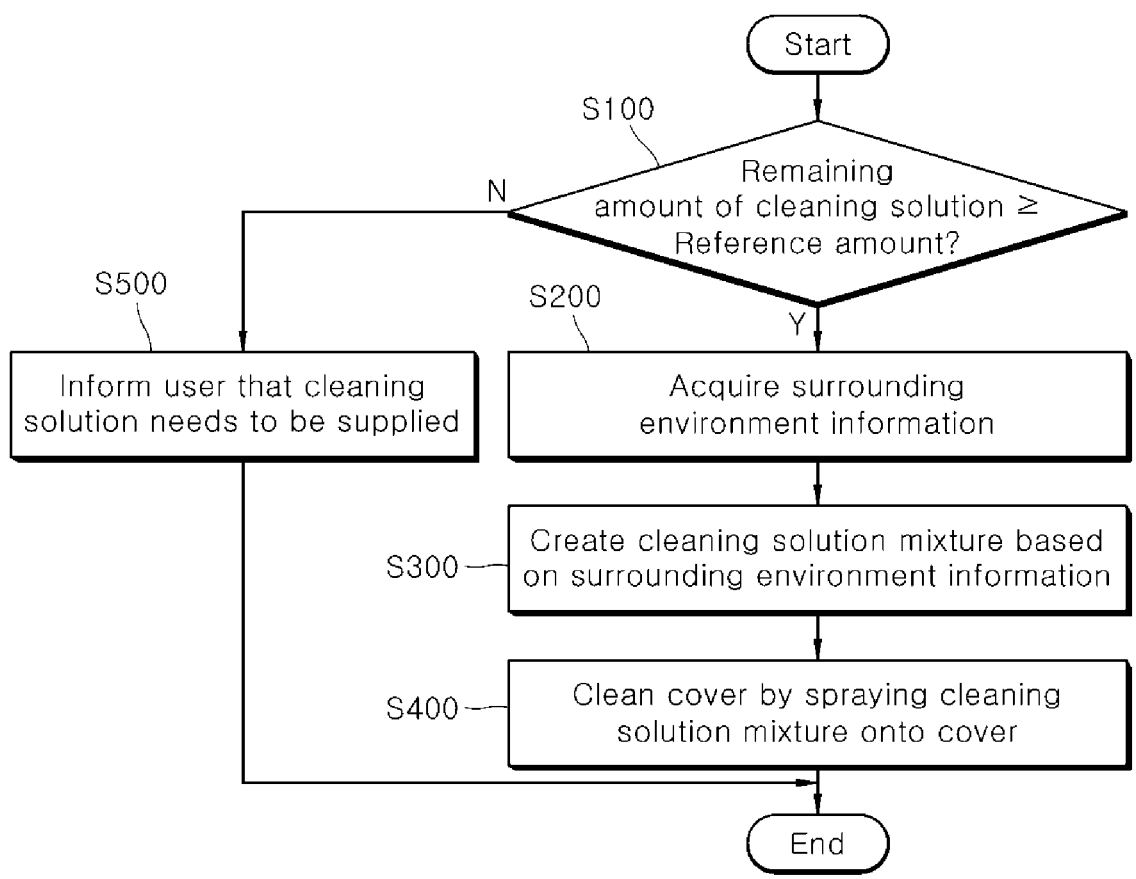
FIGS. 2 and 3 are flowcharts for describing a cleaning method of an object detection sensor in accordance with an embodiment of the present invention.
Figure 3:
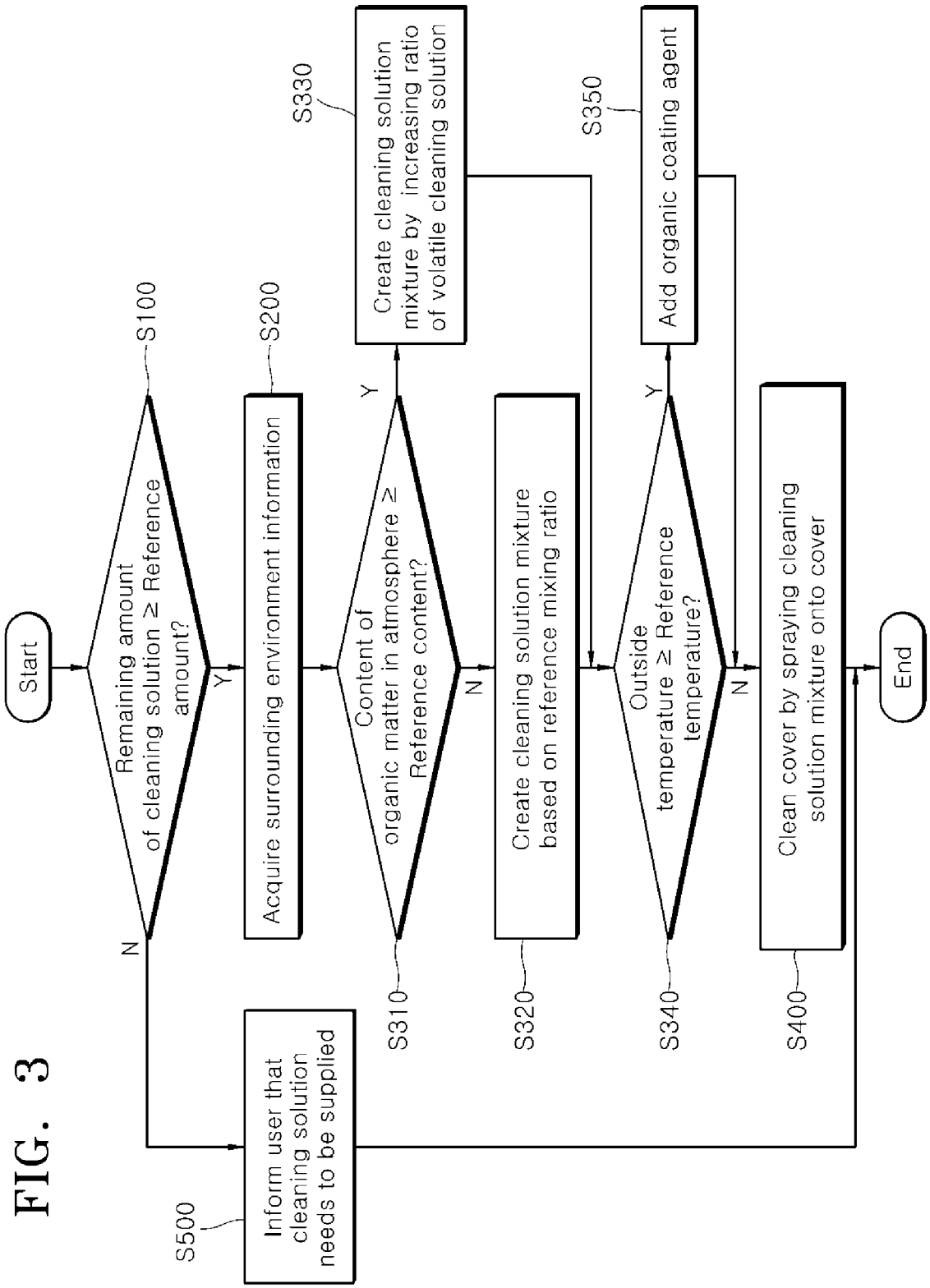

FIGS. 2 and 3 are flowcharts for describing a cleaning method of the object detection sensor in accordance with an embodiment of the present invention.

Referring to FIG. 2, the cleaning method of the object detection sensor in accordance with the embodiment of the present invention will be described as follows. First, the cleaning unit 300 may determine whether a remaining amount of the volatile cleaning solution and a remaining amount of the nonvolatile cleaning solution are equal to or more than the preset reference amount, at step S100. In other words, the cleaning unit 300 may determine whether both of the remaining amount of the volatile cleaning solution and the remaining amount of the nonvolatile cleaning solution are equal to or more than the reference amount.

When it is determined at step S100 that both of the remaining amount of the volatile cleaning solution and the remaining amount of the nonvolatile cleaning solution are equal to or more than the reference amount, the environment information acquisition unit 200 may acquire the surrounding environment information of the vehicle at step S200. The surrounding environment information may include one or more of the content of organic matter in the atmosphere and the outside temperature. Furthermore, the surrounding environment information may include the current weather situation and the region where the vehicle is driving.

Then, the cleaning unit 300 may create a cleaning solution mixture based on the surrounding environment information acquired by the environment information acquisition unit 200 at step S300.

At step S300, the cleaning unit 300 may create the cleaning solution mixture by mixing the volatile cleaning solution and the nonvolatile cleaning solution. At this time, the cleaning unit 300 may create the cleaning solution mixture by adjusting the mixing ratio of the volatile cleaning solution to the nonvolatile cleaning solution based on the content of organic matter in the atmosphere. As a method of adjusting the mixing ratio of the volatile cleaning solution to the nonvolatile cleaning solution based on the content of organic matter in the atmosphere, the cleaning unit 300 may create the cleaning solution mixture by increasing the ratio of the volatile cleaning solution as the content of organic matter in the atmosphere increases. When the content of organic matter in the atmosphere is equal to or more than the preset reference content, the cleaning unit 300 may create the cleaning solution mixture by increasing the ratio of the volatile cleaning solution with respect to the preset reference mixing ratio. Since this process has been already described above, the detailed descriptions thereof will be omitted herein.

Furthermore, at step S300, the cleaning unit 300 may create the cleaning solution mixture by adding an organic coating agent to the mixture of the volatile cleaning solution and the nonvolatile cleaning solution, when the outside temperature is equal to or higher that the preset reference temperature.

Then, the cleaning unit 300 may clean the cover 110 by spraying the cleaning solution mixture created at step S300 onto the cover 110 at step S400, thereby preventing a reduction in sensing performance of the object detection sensor 100 due to contamination by foreign matter.

On the other hand, when it is determined at step S100 that one or more of the remaining amount of the volatile cleaning solution and the remaining amount of the nonvolatile cleaning solution is less than the reference amount, the cleaning unit 300 may inform a user that one or more of the volatile cleaning solution and the nonvolatile cleaning solution need to be supplied, at step S500.

The above-described steps S100 to S500 may be performed in real time while the vehicle is driving, or periodically performed according to a preset cycle in consideration of the consumption of the volatile cleaning solution and the nonvolatile cleaning solution.

A specific implementation of the cleaning method of the object detection sensor in accordance with the embodiment of the present invention, which has been described above with reference to FIG. 2, will be described in detail with reference to FIG. 3, based on a time-series plot of step S300.

Referring to FIG. 3, the cleaning unit 300 may determine whether the remaining amount of the volatile cleaning solution and the remaining amount of the nonvolatile cleaning solution are equal to or more than the preset reference amount, at step S100. That is, the cleaning unit 300 may determine whether both of the remaining amount of the volatile cleaning solution and the remaining amount of the nonvolatile cleaning solution are equal to or more than the reference amount.

When it is determined at step S100 that both of the remaining amount of the volatile cleaning solution and the remaining amount of the nonvolatile cleaning solution are equal to or more than the reference amount, the environment information acquisition unit 200 may acquire the surrounding environment information of the vehicle at step S200.

Then, the cleaning unit 300 may determine whether the content of organic matter in the atmosphere, included in the surrounding environment information, is equal to or more than the reference content, at step S310.

When it is determined at step S310 that the content of organic matter in the atmosphere is less than the reference content, the cleaning unit 300 may primarily create a cleaning solution mixture by mixing the volatile cleaning solution and the nonvolatile cleaning solution based on the preset reference mixing ratio, at step S320. Then, step S340 to be described below may be performed.

On the other hand, when it is determined at step S310 that the content of organic matter in the atmosphere is equal to or more than the reference content, the cleaning unit 300 may primarily create the cleaning solution mixture by increasing the ratio of the volatile cleaning solution with respect to the preset reference mixing ratio, at step S330.

After step S320 or S330 is performed, the cleaning unit 300 may determine whether the outside temperature is equal to or more than the preset reference temperature, at step S340.

When it is determined at step S340 that the outside temperature is equal to or more than the reference temperature, the cleaning unit 300 may finally create the cleaning solution mixture by adding an organic coating agent to the cleaning solution mixture which was primarily created through step S320 or S330, that is, the mixture of the volatile cleaning solution and the nonvolatile cleaning solution, at step S350.

When it is determined at step S340 that the outside temperature is less than the reference temperature, step S400 below may be performed without adding the organic coating agent.

Then, the cleaning unit 300 may clean the cover 110 by spraying the cleaning solution mixture created at step S300 onto the cover 110 at step S400, thereby preventing a reduction in sensing performance of the object detection senor due to contamination by foreign matter.

On the other hand, when it is determined at step S100 that one or more of the remaining amount of the volatile cleaning solution and the remaining amount of the nonvolatile cleaning solution are less than the reference amount, the cleaning unit 300 may inform a user that one or more of the volatile cleaning solution and the nonvolatile cleaning solution need to be supplied, at step S500.

As such, the cleaning apparatus and method in accordance with the embodiments of the present invention can differently create the cleaning solution for cleaning the cover installed on the object detection sensor, depending on the surrounding environment of the vehicle, and clean the cover using the cleaning solution, thereby effectively blocking contamination of the cover by foreign matter and securing the sensing performance of the object detection sensor which is optimized to the surrounding environment of the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A cleaning apparatus of an object detection sensor mounted on a vehicle, comprising:
   an environment information acquisition unit configured to utilize a navigation system to determine a region where the vehicle is driving and acquire surrounding environment information of the vehicle; and a cleaning unit configured to create a cleaning solution mixture based on the surrounding environment information acquired by the environment information acquisition unit, and to clean a cover installed on the object detection sensor to protect the object detection sensor from foreign matter by spraying the cleaning solution mixture onto the cover, wherein:

the cleaning unit is configured to create the cleaning solution mixture by mixing a volatile cleaning solution and a nonvolatile cleaning solution;

the surrounding environment information comprises a content of organic matter in an atmosphere of the surrounding environment; and the cleaning unit is configured to create the cleaning solution mixture by adjusting a mixing ratio of the volatile cleaning solution to the nonvolatile cleaning solution based on the content of organic matter in the atmosphere.

2. The cleaning apparatus of claim 1, wherein the cleaning unit is configured to create the cleaning solution mixture by increasing the mixing ratio of the volatile cleaning solution to the nonvolatile cleaning solution as the content of organic matter in the atmosphere increases.

3. The cleaning apparatus of claim 1, wherein, when the content of organic matter in the atmosphere is equal to or greater than a preset reference content, the cleaning unit is configured to create the cleaning solution mixture by increasing the mixing ratio of the volatile cleaning solution to the nonvolatile cleaning solution according to a preset reference mixing ratio.

4. The cleaning apparatus of claim 1, wherein:

the surrounding environment information comprises outside temperature; and when the outside temperature is equal to or greater than a preset reference temperature, the cleaning unit is configured to create the cleaning solution mixture by adding an organic coating agent to a mixture of the volatile cleaning solution and the nonvolatile cleaning solution.

5. The cleaning apparatus of claim 1, wherein the object detection sensor comprises a LiDAR (Light Detection And Ranging Sensor), and the environment information acquisition unit comprises a navigation terminal.

6. The cleaning apparatus of claim 1, wherein the cleaning unit is further configured to determine whether a remaining amount of the volatile cleaning solution and a remaining amount of the nonvolatile cleaning solution are equal to or greater than a preset reference amount, and clean the cover when both of the remaining amount of the volatile cleaning solution and the remaining amount of the nonvolatile cleaning solution are equal to or greater than the reference amount.

7. The cleaning apparatus of claim 6, wherein the cleaning unit is further configured to inform a user that one or more of the volatile cleaning solution and the nonvolatile cleaning solution need to be supplied when it is determined that the one or more of the remaining amount of the volatile cleaning solution and the remaining amount of the nonvolatile cleaning solution are less than the reference amount.

* * * * *